US011376916B2

(12) United States Patent
Isshiki et al.

(10) Patent No.: US 11,376,916 B2
(45) Date of Patent: Jul. 5, 2022

(54) SUSPENSION CONTROL DEVICE AND SUSPENSION DEVICE (71) Applicant: HITACHI ASTEMO, LTD., Ibaraki (JP)

(72) Inventors: Ken Isshiki, Tochigi (JP); Eishi Ishimaru, Tochigi (JP); Kyouichi Tagami, Tochigi (JP); Katsutoshi Yokoi, Tochigi (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 362 days.

(21) Appl. No.: 16/538,366

(22) Filed: Aug. 12, 2019

(65) Prior Publication Data
US 2019/0359023 A1  Nov. 28, 2019

Related U.S. Application Data (63) Continuation of application No. PCT/JP2017/017248, filed on May 2, 2017.

(30) Foreign Application Priority Data

Mar. 24, 2017  (JP) .............................. JP2017-059882

(51) Int. Cl.
*B60G 17/0165* (2006.01)
*B60G 17/016* (2006.01)
*B60G 17/018* (2006.01)

(52) U.S. Cl.
CPC ....... *B60G 17/0165* (2013.01); *B60G 17/018* (2013.01); *B60G 17/0162* (2013.01)

(58) Field of Classification Search
CPC ............ B60G 17/0162; B60G 17/0165; B60G 17/018; B60G 17/08; B60G 2500/10;
(Continued)

(56) References Cited

U.S. PATENT DOCUMENTS 5,444,621 A     8/1995  Matsunaga et al.
8,322,728 B2 *  12/2012 Hirao ................... B60G 17/015
                                              280/5.506
(Continued)

FOREIGN PATENT DOCUMENTS

CN      108698464 A  * 10/2018 ......... B60G 17/0164
DE  10 2008 053 008 A1    10/2009
(Continued)

OTHER PUBLICATIONS

Office Action for CN Patent Application No. 201780086414.2, dated Jun. 2, 2021, 11 pages.
(Continued)

*Primary Examiner* — Atul Trivedi
(74) *Attorney, Agent, or Firm* — Casimir Jones, S.C.; Brian F. Bradley (57) ABSTRACT

A damping force of a suspension is controlled appropriately in accordance with a road surface condition. An ECU (600) includes: a road surface determining section (84) configured to determine a road surface condition; and a rolling attitude control section (682) configured to calculate a steering-based desired control variable, which is a candidate for a control variable for controlling a damping force of a suspension, in accordance with a result of the determination by the road surface determining section (84).

7 Claims, 7 Drawing Sheets

(58) Field of Classification Search
CPC ...... B60G 2400/0523; B60G 2400/104; B60G 2400/106; B60G 2400/208; B60G 2400/32; B60G 2400/38; B60G 2400/39; B60G 2400/41; B60G 2400/42
USPC .......................................................... 701/37
See application file for complete search history.

(56) References Cited

U.S. PATENT DOCUMENTS

| | | | | |
|---|---|---|---|---|
| 2008/0196966 | A1* | 8/2008 | Maruyama | B62D 17/00 180/446 |
| 2008/0243339 | A1* | 10/2008 | Nishimori | B60G 7/003 701/41 |
| 2010/0191423 | A1* | 7/2010 | Koyama | B60W 30/09 701/42 |
| 2010/0211261 | A1* | 8/2010 | Sasaki | B60G 17/016 701/37 |
| 2011/0029198 | A1* | 2/2011 | Mizuta | B60G 17/06 701/38 |
| 2011/0208391 | A1 | 8/2011 | Mizuta et al. | |
| 2013/0197755 | A1 | 8/2013 | Otake et al. | |
| 2014/0005889 | A1* | 1/2014 | Hayakawa | B60G 17/01933 701/37 |
| 2014/0093128 | A1 | 4/2014 | Teshima | |
| 2014/0265170 | A1* | 9/2014 | Giovanardi | F15B 13/0444 280/5.5 |
| 2015/0066295 | A1* | 3/2015 | Kanda | B60G 17/01933 701/38 |
| 2015/0210310 | A1* | 7/2015 | Akatsuka | B62D 5/0472 701/41 |
| 2015/0224845 | A1* | 8/2015 | Anderson | B60G 17/052 701/37 |
| 2015/0290995 | A1* | 10/2015 | Kanda | B60G 17/0182 701/37 |
| 2016/0031481 | A1 | 2/2016 | Kentaro et al. | |

FOREIGN PATENT DOCUMENTS

| | | | | |
|---|---|---|---|---|
| EP | 2253492 A1 * | 11/2010 | | B60G 17/06 |
| JP | 1-141113 | 6/1989 | | |
| JP | 4-56616 | 2/1992 | | |
| JP | 5-229328 | 9/1993 | | |
| JP | 6-48139 | 2/1994 | | |
| JP | 6-48288 | 2/1994 | | |
| JP | 6-219307 | 8/1994 | | |
| JP | 7-156628 | 6/1995 | | |
| JP | 7-277167 | 10/1995 | | |
| JP | 8-108723 | 4/1996 | | |
| JP | 11-139131 | 5/1999 | | |
| JP | 2000-233664 | 8/2000 | | |
| JP | 2003-137121 | 5/2003 | | |
| JP | 2004-142550 | 5/2004 | | |
| JP | 2004-291815 | 10/2004 | | |
| JP | 2006-008055 | 1/2006 | | |
| JP | 2006-123827 | 5/2006 | | |
| JP | 2006-273185 | 10/2006 | | |
| JP | 2007-038766 | 2/2007 | | |
| JP | 2008-179300 | 8/2008 | | |
| JP | 2008-231989 | 10/2008 | | |
| JP | 2009-101809 | 5/2009 | | |
| JP | 2010-116073 | 5/2010 | | |
| JP | 2012-101666 | 5/2012 | | |
| JP | 2013-107628 | 6/2013 | | |
| JP | 2013-212715 | 10/2013 | | |
| JP | 2016-022830 | 2/2016 | | |
| JP | 2016-104632 | 6/2016 | | |
| JP | 2016-210352 | 12/2016 | | |
| KR | 20090033144 A * | 4/2009 | | B60G 17/019 |
| WO | WO-2009110300 A1 * | 9/2009 | | B60G 17/06 |
| WO | WO 2010/092687 | 8/2010 | | |
| WO | WO-2013111500 A1 * | 8/2013 | | B60G 17/0165 |
| WO | WO-2014002444 A1 * | 1/2014 | | B60G 17/016 |
| WO | WO-2015153811 A1 * | 10/2015 | | B60G 17/0195 |
| WO | WO-2019218097 A1 * | 11/2019 | | B60C 23/04 |

OTHER PUBLICATIONS

1st Office Action for 2017-059880, dated Jun. 6, 2017, 3 pages.
1st Office Action for 2017-059882, dated Jun. 13, 2017, 3 pages.
1st Office Action for 2017-059883, dated Jun. 13, 2017, 3 pages.
1st Office Action for 2017-059884, dated Jun. 6, 2017, 3 pages.
2nd Office Action for 2017-059880, dated Sep. 26, 2017, 2 pages.
2nd Office Action for 2017-059882, dated Oct. 24, 2017, 2 pages.
2nd Office Action for 2017-059883, dated Oct. 24, 2017, 2 pages.
2nd Office Action for 2017-059884, dated Sep. 26, 2017, 4 pages.
English Translation of International Preliminary Report on Patentability for PCT/JP2017/017246, dated Oct. 3, 2019, 9 pages.
English Translation of International Preliminary Report on Patentability for PCT/JP2017/017248, dated Oct. 3, 2019, 8 pages.
English Translation of International Preliminary Report on Patentability for PCT/JP2017/017249, dated Oct. 3, 2019, 11 pages.
English Translation of International Preliminary Report on Patentability for PCT/JP2017/017250, dated Oct. 3, 2019, 8 pages.
International Search Report for PCT/JP2017/017246, dated Jun. 27, 2017, 2 pages.
International Search Report for PCT/JP2017/017248, dated Jun. 13, 2017, 2 pages.
International Search Report for PCT/JP2017/017249, dated Jun. 13, 2017, 2 pages.
International Search Report for PCT/JP2017/017250, dated Jun. 27, 2017, 2 pages.
Office Action for DE Application No. 112017007306.5, dated Jan. 28, 2021, 6 pages.

* cited by examiner

SUSPENSION CONTROL DEVICE AND SUSPENSION DEVICE

This application is a Continuation of PCT International Application No. PCT/JP2017/017248 filed in Japan on May 2, 2017, which claims the benefit of Patent Application No. 2017-059882 filed in Japan on Mar. 24, 2017, the entire contents of which are hereby incorporated by reference.

TECHNICAL FIELD

The present invention relates to: a suspension control device which controls a damping force of a suspension device; and the suspension device.

BACKGROUND ART

Suspension devices capable of controlling a damping force have been known. For example, Patent Literatures 1 and 2 each disclose a suspension device which controls a damping force in accordance with steering torque.

CITATION LIST

Patent Literature

[Patent Literature 1] Japanese Patent Application Publication, Tokukai, No. 2010-116073 (Publication Date: May 27, 2010)
[Patent Literature 2] Japanese Patent Application Publication, Tokukaihei, No. H1-141113 (Publication Date: Jun. 2, 1989)

SUMMARY OF INVENTION

Technical Problem

In the suspension control device, it is preferable to appropriately control a damping force of a suspension in accordance with a road surface condition.

It is an object of the present invention to provide a suspension control device and a suspension device each capable of appropriately controlling a damping force of a suspension in accordance with a road surface condition.

Solution to Problem

In order to attain the above object, an embodiment of the present invention is directed to a suspension control device for controlling a damping force of a suspension, including: a road surface determining section configured to determine a road surface condition; and a control variable calculating section configured to calculate, in accordance with a result of the determination by the road surface determining section, a steering-based desired control variable which is to be referred to in controlling the damping force of the suspension.

In order to attain the above object, an embodiment of the present invention is directed to a suspension device including: a suspension; and a control section configured to control a damping force of the suspension, the control section comprising: a road surface determining section configured to determine a road surface condition; and a control variable calculating section configured to calculate, in accordance with a result of the determination by the road surface determining section, a steering-based desired control variable which is to be referred to in controlling the damping force of the suspension.

Advantageous Effects of Invention

According to the present invention, it is possible to appropriately control damping force of a suspension in accordance with a road surface condition.

DESCRIPTION OF EMBODIMENTS

Embodiment 1

The following description will discuss Embodiment 1 of the present invention in detail.

(Configuration of Vehicle 900)

Figure 1:
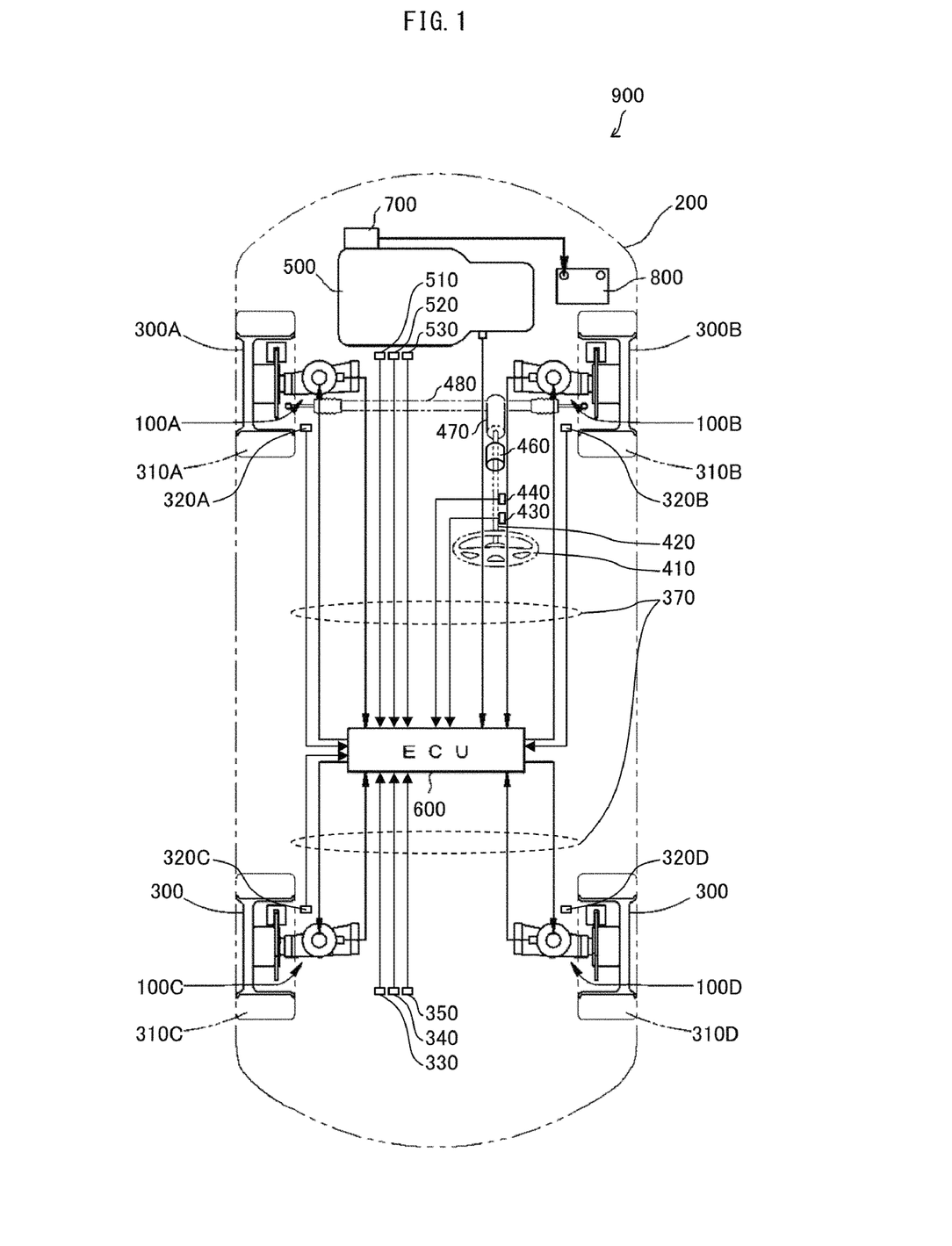
FIG. 1 is a diagram schematically illustrating a configuration of a vehicle in accordance with Embodiment 1 of the present invention.

FIG. 1 is a diagram schematically illustrating a configuration of a vehicle 900 in accordance with Embodiment 1 of the present invention. As illustrated in FIG. 1, the vehicle 900 includes suspensions 100, a vehicle body 200, wheels 300, tires 310, a steering member 410, a steering shaft 420, a torque sensor 430, a steering angle sensor 440, a torque applying section 460, a rack and pinion mechanism 470, a rack shaft 480, an engine 500, an electronic control unit (ECU) (control device, control section) 600, a power-generating device 700, and a battery 800. Here, the suspensions 100 and the ECU 600 constitute a suspension device in accordance with Embodiment 1.

The wheels 300 to which the tires 310 are attached are suspended on the vehicle body 200 by the suspension 100. Since the vehicle 900 is a four-wheeled vehicle, four of a set including a suspension 100, a wheel 300, and a tire 310 are provided.

Note that each of a left front wheel, a right front wheel, a left rear wheel, and a right rear wheel includes a tire and a wheel, which are referred to as a tire 310A and a wheel 300A, a tire 310B and a wheel 300B, a tire 310C and a wheel 300C, or a tire 310D and a wheel 300D. Similarly, respective configurations associated with the left front wheel, the right front wheel, the left rear wheel, and the right rear wheel are denoted by signs "A", "B", "C", and "D".

The suspension 100 includes a hydraulic shock absorber, an upper arm and a lower arm. Further, the hydraulic shock absorber includes, as an example, a solenoid valve which is an electromagnetic valve for adjusting a damping force which is caused by the hydraulic shock absorber. This, however, by no means limits Embodiment 1. The hydraulic shock absorber can employ an electromagnetic valve other than the solenoid valve, as the electromagnetic valve for adjusting a damping force. For example, the hydraulic shock absorber can be configured to include, as the electromagnetic valve, an electromagnetic valve which utilizes electromagnetic fluid (magnetic fluid).

The power-generating device 700 is attached to the engine 500. Power generated by the power-generating device 700 is accumulated in the battery 800.

The steering member 410 which a driver operates is connected to one end of the steering shaft 420 so as to be capable of transmitting torque. Meanwhile, the other end of the steering shaft 420 is connected to the rack and pinion mechanism 470.

The rack and pinion mechanism 470 is a mechanism for converting rotation of the steering shaft 420 about an axis of the steering shaft 420 to displacement of the rack shaft 480 along a direction of an axis of the rack shaft 480. When the rack shaft 480 is displaced along the direction of the axis of the rack shaft 480, the wheel 300A and the wheel 300B are turned via a tie rod and a knuckle arm.

The torque sensor 430 detects a steering torque which is applied to the steering shaft 420, that is, a steering torque which is applied to the steering member 410, and supplies, to the ECU 600, a torque sensor signal indicative of a result of this detection. More specifically, the torque sensor 430 detects a torsion of a torsion bar, which is provided in the steering shaft 420, and outputs a result of this detection as the torque sensor signal. Note that the torque sensor 430 can be a well-known sensor such as a hall IC, an MR element, or a magnetostrictive torque sensor.

The steering angle sensor 440 detects a steering angle of the steering member 410, and supplies a result of this detection to the ECU 600.

The torque applying section 460 applies, to the steering shaft 420, an assist torque or a reaction torque in accordance with a steering control variable which is supplied from the ECU 600. The torque applying section 460 includes a motor for generating the assist torque or the reaction torque in accordance with the steering control variable, and a torque transmission mechanism for transmitting the torque generated by the motor to the steering shaft 420.

Note that, specific examples of the "control variable" herein encompass a current value, a duty ratio, a damping rate, and a damping ratio.

Note that the expression "connected . . . so as to be capable of transmitting torque" in the above description means that two members are connected to each other such that rotation of one of the two members causes rotation of the other one of the two members. Example cases of such a connection encompass at least a case where the two members are integrally formed, a case where one of the two members is directly or indirectly fixed to the other one of the two members, and a case where the two members are connected to each other via a joint member or the like so as to interlock with each other.

Though steering devices described as examples above are each a steering device in which members from the steering member 410 to the rack shaft 480 are always mechanically connected to one another, this configuration by no means limits Embodiment 1. The steering device in accordance with Embodiment 1 can be, for example, a steering device of a steering by wire system. The matters described below in the present specification are applicable to steering devices of a steering by wire system.

The ECU 600 carries out overall control of various electronic devices of the vehicle 900. More specifically, the ECU 600 controls a magnitude of the assist torque or the reaction torque to be applied to the steering shaft 420, by adjusting the steering control variable to be supplied to the torque applying section 460.

Further, the ECU 600 supplies a suspension control variable to the solenoid valve which is provided in the hydraulic shock absorber in the suspension 100, so as to control opening/closing of the solenoid valve. In order to allow for this control, an electrical power line is provided. The electric power line is used for supplying a drive power from the ECU 600 to the solenoid valve.

Further, the vehicle 900 includes a wheel speed sensor 320 which is provided for each of the wheels 300 and detects a wheel speed of each wheel 300, a lateral G sensor 330 which detects an acceleration in a lateral direction of the vehicle 900, a longitudinal G sensor 340 which detects an acceleration in a longitudinal direction of the vehicle 900, a yaw rate sensor 350 which detects a yaw rate of the vehicle 900, an engine torque sensor 510 which detects a torque generated by the engine 500, an engine speed sensor 520 which detects the number of rotations of the engine 500, and a brake pressure sensor 530 which detects a pressure applied to brake fluid provided in a brake device. Results of detection by the above various sensors are supplied to the ECU 600.

Note that though not illustrated, the vehicle 900 includes a brake device which can be controlled by an antilock brake system (ABS), a traction control system (TCS), and a vehicle stability assist (VSA). The antilock brake system (ABS) prevents the wheels from locking up in breaking. The traction control system (TCS) prevents wheel slip of the wheels in acceleration of the vehicle 900. The vehicle stability assist (VSA) is a control system for stabilizing vehicle behavior, which system has an automatic braking function for, for example, yaw moment control in turning and a brake assist function.

The ABS, TCS, and VSA here compare a wheel speed determined in accordance with an estimated vehicle body speed and a wheel speed detected by the wheel speed sensor 320, and determines that the vehicle 900 is slipping in a case where a difference between respective values of these two wheel speeds is not less than a predetermined value. The ABS, the TCS, and the VSA are intended to stabilize the behavior of the vehicle 900, by carrying out the most appropriate brake control and traction control in accordance with a running state of the vehicle 900 through the above process.

Further, supply of the results of detection by the above various sensors to the ECU 600 and transmission of control signals from the ECU 600 to each section are carried out via a controller area network (CAN) 370.

(Suspension 100)

Figure 2:
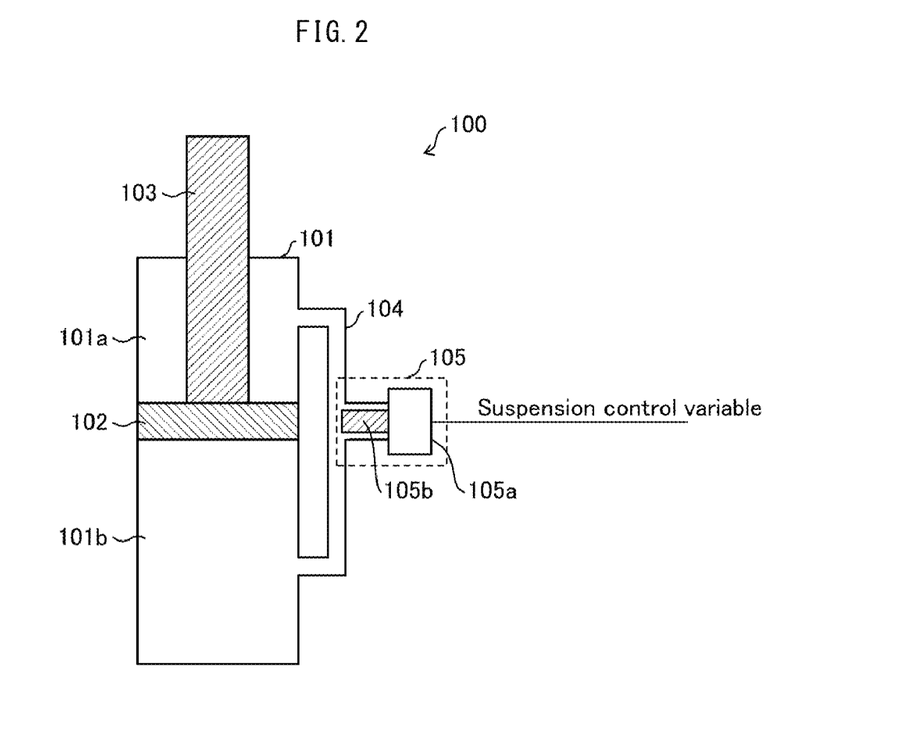
FIG. 2 is a cross-sectional view schematically illustrating an example configuration of a hydraulic shock absorber in a suspension in accordance with Embodiment 1 of the present invention.

FIG. 2 is a cross-sectional view schematically illustrating an example configuration of the hydraulic shock absorber in the suspension 100 in accordance with Embodiment 1. As illustrated in FIG. 2, the suspension 100 includes a cylinder 101, a piston 102 provided in the cylinder 101 so as to be slidable, and a piston rod 103 which is fixed to the piston 102. The cylinder 101 is partitioned into an upper chamber 101a and a lower chamber 101b by the piston 102, and the upper chamber 101a and the lower chamber 101b are filled with hydraulic oil.

Moreover, as illustrated in FIG. 2, the suspension 100 includes a communicating path 104 which allows the upper chamber 101a and the lower chamber 101b to communicate with each other. In the communicating path 104, a solenoid valve 105 is provided. The solenoid valve 105 adjusts a damping force of the suspension 100.

The solenoid valve 105 includes a solenoid 105a and a valve 105b. The valve 105b is driven by the solenoid 105a, and changes a cross-sectional area of a fluid channel of the communicating path 104.

The solenoid 105a causes the valve 105b to stretch/retract in accordance with the suspension control variable supplied from the ECU 600. This changes the cross-sectional area of the fluid channel of the communicating path 104 and consequently changes the damping force of the suspension 100.

(ECU 600)

Figure 3:
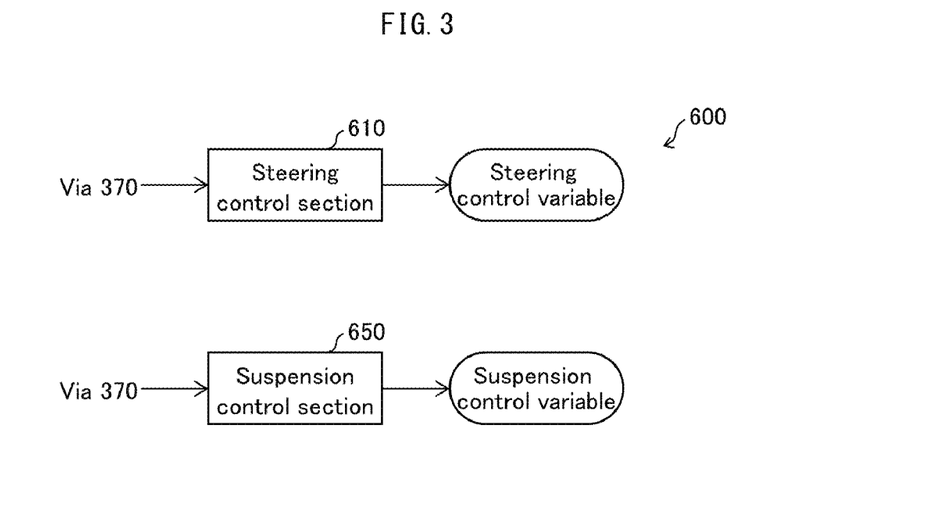
FIG. 3 is a block diagram schematically illustrating an ECU in accordance with Embodiment 1 of the present invention.

The following will specifically discuss the ECU 600 with reference to another drawing. FIG. 3 is a diagram schematically illustrating the ECU 600.

As illustrated in FIG. 3, the ECU 600 includes a steering control section 610 and a suspension control section (suspension control device) 650.

The steering control section 610 refers to the results of detection by the various sensors in the CAN 370, and determines a level of the steering control variable which is to be supplied to the torque applying section 460.

Note that as used herein, the wording "referring to" may mean "using", "considering", "depending on" or the like.

The suspension control section 650 refers to the results of detection by the various sensors in the CAN 370, and determines a level of the control variable which is to be supplied to the solenoid valve 105 provided in the hydraulic shock absorber of the suspension 100.

Further, the process of "determining a level of the control variable" includes a case where the level of the control variable is set to zero, that is, a case where no control variable is supplied.

Alternatively, the suspension control section 610 and the suspension control section 650 may be provided as separate ECUs. In such a configuration, the steering control section 610 and the suspension control section 650 communicate with each other by use of communication means, so that control described in the present specification is carried out.

(Suspension Control Section)

Figure 4:
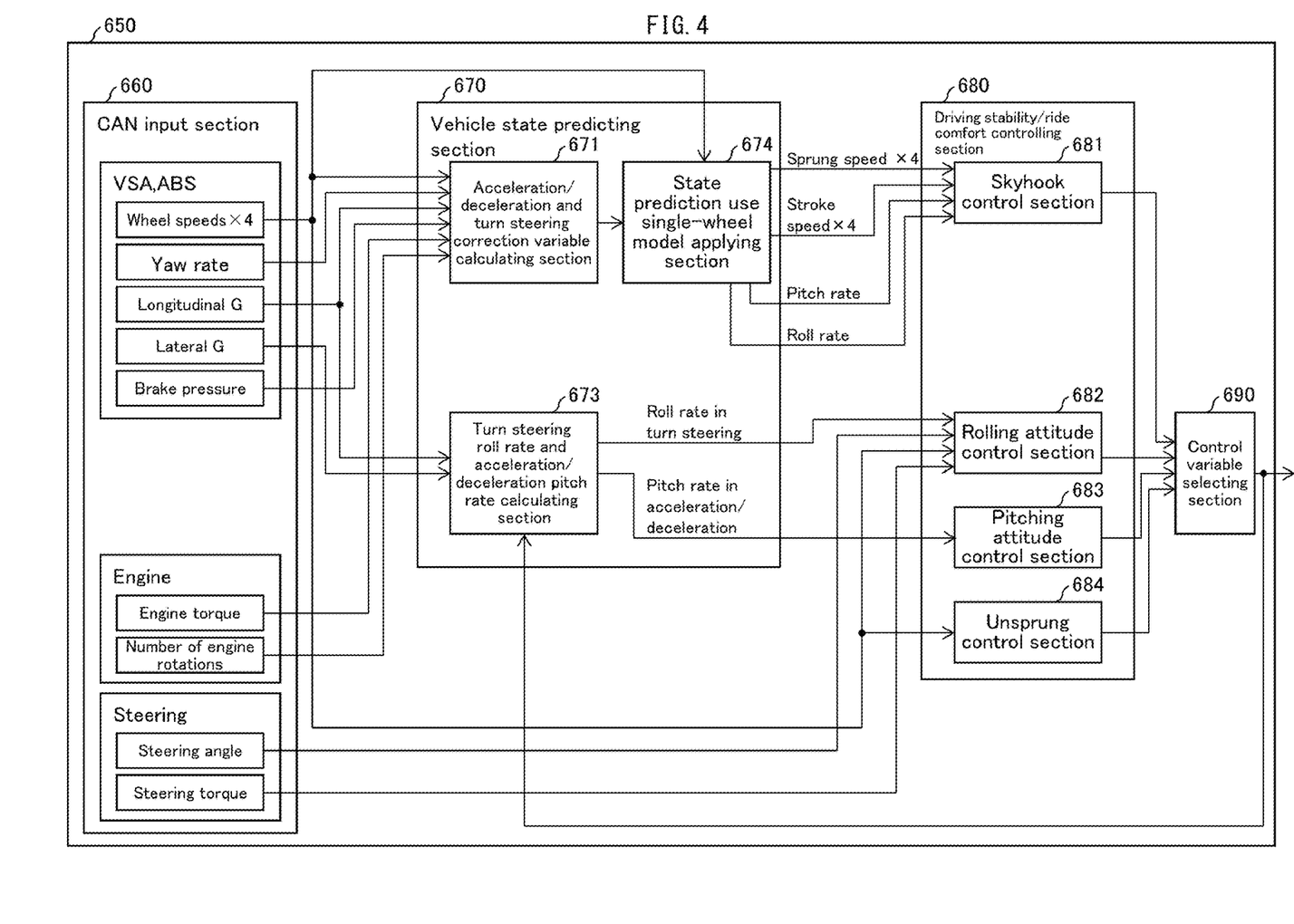
FIG. 4 is a block diagram illustrating an example configuration of a suspension control section in accordance with Embodiment 1 of the present invention.

Next, the following will more specifically discuss a suspension control section with reference to FIG. 4. FIG. 4 is a block diagram illustrating an example configuration of the suspension control section 650.

The suspension control section 650 includes a CAN input section 660, a vehicle state predicting section 670, a driving stability/ride comfort controlling section 680, and a control variable selecting section 690, as illustrated in FIG. 4.

The CAN input section 660 obtains various signals via the CAN 370. As illustrated in FIG. 4, the CAN input section 660 obtains the following signals (sensors in parentheses are signal sources).

wheel speeds of four wheels (wheel speed sensors 320A to 320D)
yaw rate (yaw rate sensor 350)
longitudinal G (longitudinal G sensor 340)
lateral G (lateral G sensor 330)
brake pressure (brake pressure sensor 530)
engine torque (engine torque sensor 510)
number of engine rotations (engine speed sensor 520)
steering angle (steering angle sensor 440)
steering torque (torque sensor 430)

The vehicle state predicting section 670 predicts the state of the vehicle 900 with reference to the various signals obtained by the CAN input section 660. The vehicle state predicting section 670 outputs, as results of the above prediction, sprung speeds of the four wheels, stroke speeds of the four wheels, a pitch rate, a roll rate, a roll rate in turn steering, and a pitch rate in acceleration/deceleration.

The vehicle state predicting section 670 includes an acceleration/deceleration and turn steering correction variable calculating section 671, a turn steering roll rate and acceleration/deceleration pitch rate calculating section 673, and a state prediction use single-wheel model applying section 674, as illustrated in FIG. 4.

The acceleration/deceleration and turn steering correction variable calculating section 671 calculates, with reference to the yaw rate, the longitudinal G, the wheel speeds of the four wheels, the brake pressure, the engine torque, and the number of rotations of engine, a speed in a longitudinal direction of the vehicle body, a ratio of an inner wheel difference (difference between tracks followed by front and back inner wheels in turning) and an outer wheel difference (difference between tracks followed by front and back outer wheels in turning), and an adjustment gain, and supplies results of the above calculation to the state prediction use single-wheel model applying section 674.

The turn steering roll rate and acceleration/deceleration pitch rate calculating section 673 calculates the roll rate in turn steering and the pitch rate in acceleration/deceleration, with reference to the longitudinal G and the lateral G. Results of this calculation are supplied to the state prediction use single-wheel model applying section 674.

Further, the turn steering roll rate and acceleration/deceleration pitch rate calculating section 673 supplies, as the roll rate value, the roll rate in turn steering thus calculated to the steering control section 610. The turn steering roll rate and acceleration/deceleration pitch rate calculating section 673 can be configured to further refer to the suspension control variable outputted from the control variable selecting section 690.

Note that as described later, the roll rate value can be configured to express a roll rate as a shift from a reference value of "0" which is a value in a case where inclination of the vehicle 900 has not changed for a predetermined minute time.

Further, the turn steering roll rate and acceleration/deceleration pitch rate calculating section 673 can provide a dead zone of approximately ±0.5 in the roll rate in turn steering. Here, the sign "+" indicates a left side of the vehicle 900 and the sign "−" indicates a right side of the vehicle 900.

The state prediction use single-wheel model applying section 674 applies, to each wheel, a state prediction use single-wheel model and calculates the sprung speeds of the four wheels, the stroke speeds of the four wheels, the pitch rate, and the roll rate, with reference to the results of the calculation by the acceleration/deceleration and turn steering correction variable calculating section 671. Results of this calculation are supplied to the driving stability/ride comfort controlling section 680.

The driving stability/ride comfort controlling section 680 includes a skyhook control section 681, a rolling attitude control section (control variable calculating section) 682, a pitching attitude control section 683, and an unsprung control section 684.

The skyhook control section 681 suppresses shaking of the vehicle when the vehicle goes over a bumpy road surface and carries out ride comfort control (damping control) for increasing ride comfort.

The skyhook control section 681 determines a desired skyhook control variable, with reference to, for example, the sprung speeds of the four wheels, the stroke speeds of the four wheels, the pitch rate, and the roll rate, and supplies a result of this determination to the control variable selecting section 690.

As a more specific example, the skyhook control section 681 sets a damping force base value on the basis of the sprung speeds with reference to a sprung-damping force map. Further, the skyhook control section 681 calculates a desired skyhook damping force by multiplying, by a skyhook gain, the damping force base value thus set. Then, the skyhook control section 681 determines the desired skyhook control variable on the basis of the desired skyhook damping force and the stroke speeds.

The rolling attitude control section 682 carries out rolling attitude control by calculating desired control variables with reference to the roll rate in turn steering, the steering angle signal indicative of the steering angle, the steering torque signal indicative of the steering torque, and a wheel speed signal indicative of the wheel speeds of four wheels. The desired control variables thus calculated are supplied to the control variable selecting section 690. A specific configuration of the rolling attitude control section 682 will be described later.

The pitching attitude control section 683 carries out pitching control with reference to the pitch rate in acceleration/deceleration, determines a desired pitching control variable, and then supplies a result of this determination to the control variable selecting section 690.

The unsprung control section 684 carries out damping control below a spring of the vehicle 900 with reference to the wheel speeds of the four wheels, and determines a desired unsprung damping control variable. A result of this determination is supplied to the control variable selecting section 690.

The control variable selecting section 690 selects and outputs, as the suspension control variable, a desired control variable whose value is the largest from among the desired skyhook control variable, the desired control variables supplied from the rolling attitude control section 682, the desired pitching control variable, the desired unsprung damping control variable, and a desired vehicle speed-dependent damping control variable.

Note that the suspension control section 650 may be configured so as not to include the control variable selecting section 690. In such a configuration, for example, the steering-based desired control variable is replaced by the suspension control variable.

(Rolling Attitude Control Section 682)

Figure 5:
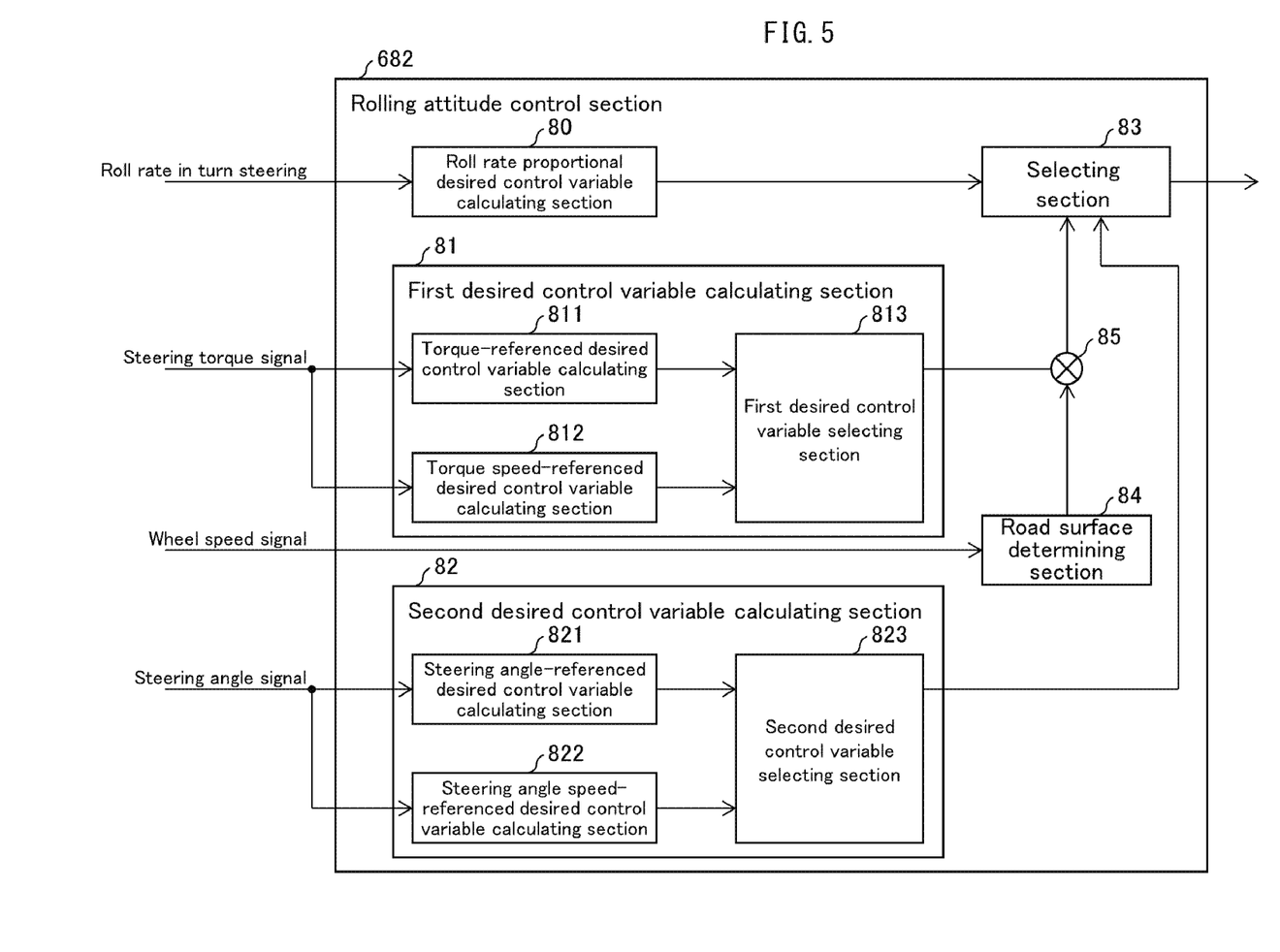
FIG. 5 is a block diagram illustrating an example configuration of a rolling attitude control section in accordance with Embodiment 1 of the present invention.

The rolling attitude control section 682 calculates the suspension control variable for controlling the damping force of the suspension, in accordance with a result of determination by the road surface determining section.

The following will discuss a specific configuration of the rolling attitude control section 682, with reference to FIG. 5. FIG. 5 is a block diagram illustrating an example configuration of the rolling attitude control section 682. The rolling attitude control section 682 calculates a steering-based desired control variable which becomes a candidate for the suspension control variable, in other words, a steering-based desired control variable which is to be referred to in controlling the damping force of the suspension, with reference to the steering torque signal, the steering angle signal, and the wheel speed signal. The steering-based desired control variable calculated by the rolling attitude control section 682 here becomes the suspension control variable, when selected by the control variable selecting section 690. Therefore, the rolling attitude control section 682 can be also expressed as a section which calculates the suspension control variable.

As illustrated in FIG. 5, the rolling attitude control section 682 includes a roll rate proportional desired control variable calculating section 80, a first desired control variable calculating section 81, a second desired control variable calculating section 82, a selecting section 83, a road surface determining section 84, and a multiplying section 85.

The roll rate proportional desired control variable calculating section 80 calculates the roll rate proportional desired control variable, with reference to the roll rate in turn steering supplied from the turn steering roll rate and acceleration/deceleration pitch rate calculating section 673.

The first desired control variable calculating section 81 calculates a first desired control variable with reference to the steering torque signal. Specifically, the first desired control variable calculating section 81 calculates the first desired control variable with reference to the steering torque signal so that rolling of the vehicle 900 will be suppressed and an attitude of the vehicle 900 will be flatter. For example, in a case where the steering member 410 is steered to turn in a certain turning direction and the vehicle 900 accordingly travels along a curve intended by the turning direction of the steering member 410, the first desired control variable is calculated so as to increase the damping force of the suspension on the outer side of the curve (i.e., on the side opposite to the turning direction). In other words, the first desired control variable is calculated so as to make the suspension stiff on the side opposite to the turning direction. Furthermore, it is also possible to calculate the first desired control variable which increases the damping force of the suspension on the inner side of the curve in addition to the damping force of the suspension on the outer side of the curve.

The first desired control variable calculating section 81 includes a torque-referenced desired control variable calculating section 811, a torque speed-referenced desired control variable calculating section 812, and a first desired control variable selecting section 813, as illustrated in FIG. 5.

The torque-referenced desired control variable calculating section 811 calculates a torque-referenced desired control variable with reference to the torque indicated by the steering torque signal. The torque speed-referenced desired control variable calculating section 812 calculates a torque speed with reference to a change over time in the torque indicated by the steering torque signal, and further calculates a torque speed-referenced desired control variable with reference to the torque speed thus calculated.

The first desired control variable selecting section 813 selects, as a torque-derived desired control variable (first desired control variable), a desired control variable having a higher value from between the torque-referenced desired control variable and the torque speed-referenced desired control variable.

The second desired control variable calculating section calculates a second desired control variable with reference to the steering angle signal. Specifically, the second desired control variable calculating section 82 calculates the second desired control variable with reference to the steering angle signal so that the rolling of the vehicle 900 will be suppressed and the attitude of the vehicle 900 will be flatter. For example, in a case where the steering member 410 is steered to turn in a certain turning direction and the vehicle 900 accordingly travels along a curve intended by the turning direction of the steering member 410, the second desired control variable is calculated so as to increase the damping force of the suspension on the outer side of the curve (i.e., on the side opposite to the turning direction). In other words, the second desired control variable is calculated so as to make the suspension stiff on the side opposite to the turning direction. Furthermore, it is also possible to calculate the second desired control variable which increases the damping force of the suspension on the inner side of the curve in addition to the damping force of the suspension on the outer side of the curve.

The second desired control variable calculating section includes a steering angle-referenced desired control variable calculating section 821, a steering angle speed-referenced desired control variable calculating section 822, and a second desired control variable selecting section 823, as illustrated in FIG. 5.

The steering angle-referenced desired control variable calculating section 821 calculates a steering angle-referenced desired control variable with reference to the steering angle indicated by the steering angle signal. The steering angle speed-referenced desired control variable calculating section 822 calculates a steering angle speed with reference to a change over time in the steering angle indicated by the steering angle signal, and further calculates a steering angle speed-referenced desired control variable with reference to the steering angle speed thus calculated.

The second desired control variable calculating section selects, as a steering angle-derived desired control variable (second desired control variable), a desired control variable having a higher value from between the steering angle-referenced desired control variable and the steering angle speed-referenced desired control variable.

The road surface determining section 84 determines a road surface condition with reference to the wheel speed signal and supplies a coefficient indicative of a result of this determination to the multiplying section 85. A specific example configuration of the road surface determining section 84 will be described later.

The multiplying section 85 multiplies, by the coefficient supplied by the road surface determining section 84, the first desired control variable calculated by the first desired control variable calculating section 81, and supplies, to the selecting section 83, the first desired control variable multiplied by the coefficient.

The selecting section 83 selects, as the steering-based desired control variable, a desired control variable having a higher value from among the first desired control variable multiplied by the coefficient, the second desired control variable, and the roll rate proportional desired control variable. Then, the selecting section 83 outputs the desired control variable thus selected.

Since as described above, the rolling attitude control section 682 calculates the steering-based desired control variable, which becomes a candidate for the suspension control variable, in accordance with a result of determination by the road surface determining section, it is possible to appropriately control the damping force of the suspension in accordance with the road surface condition.

Further, the rolling attitude control section 682 includes the first desired control variable calculating section for calculating the first desired control variable, the multiplying section for multiplying a value of the first desired control variable by the coefficient in accordance with the result of determination by the road surface determining section 84, and the selecting section 83 for selecting the steering-based desired control variable, which is a candidate for the suspension control variable, from among a plurality of candidates including the first desired control variable multiplied by the coefficient. This makes it possible to suitably set the desired control variable in accordance with the result of determination by the road surface determining section.

In addition, the first desired control variable is calculated with reference to the steering torque signal indicative of the steering torque which is applied to the steering member 410, and then, the first desired control variable is multiplied by the coefficient indicative of the result of the above-described road surface determination. This allows for a control in which the first desired control variable which is the torque-derived desired control variable is multiplied by a coefficient smaller than 1 in accordance with the road surface condition, so that the torque-derived desired control variable is unlikely to be selected as the suspension control variable.

(Road Surface Determining Section)

Figure 6:
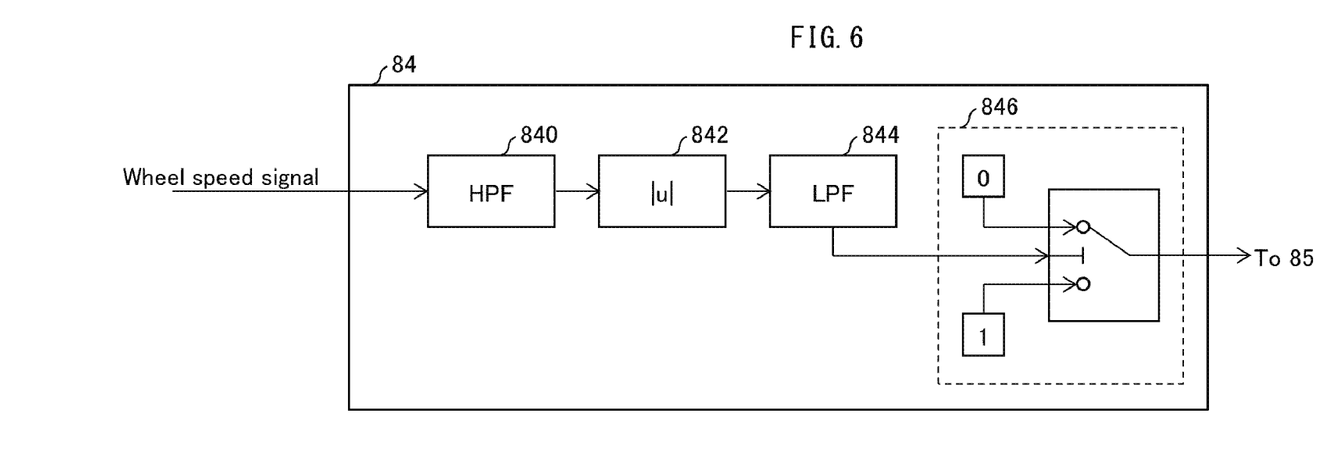
FIG. 6 is a block diagram illustrating an example configuration of a road surface determining section in accordance with Embodiment 1 of the present invention.

Next, the following will more specifically discuss the road surface determining section 84 with reference to FIG. 6. The road surface determining section 84 is configured to determine the road surface condition with reference to a reference signal for carrying out the road surface determination, and to output a coefficient indicative of a result of the road surface determination.

In Embodiment 1, the following will discuss a configuration in which the wheel speed signal indicative of the wheel speeds of the four wheels is referred to as the above reference signal for carrying out the road surface determination. In general, in a case where a road surface is bumpy, a radius of the tire 310 becomes smaller due to a protrusion of the road surface and the radius of the tire 310 becomes larger due to a depression of the road surface. When the radius of the tire 310 varies as described above, the wheel speed accordingly varies. Therefore, it can be said that the wheel speed signal is a suitable signal for determining the road surface condition.

Note that a configuration in which a reference signal other than the wheel speed signal is referred to will be discussed in Embodiment 3.

FIG. 6 is a block diagram illustrating an example configuration of the road surface determining section 84. As illustrated in FIG. 6, the road surface determining section 84 includes a high-pass filter (HPF) 840, an absolute value calculating section 842, a low-pass filter (LPF) 844, and a coefficient determining section 846. As illustrated in FIG. 6, the wheel speed signal is inputted to the high-pass filter 840, and the low-pass filter 844 is provided in a stage subsequent to the high-pass filter 840.

The high-pass filter 840 acts on the wheel speed signal, and extracts a variation in wheel speed due to the road surface condition, by removing or decreasing, from the wheel speed signal, a frequency component whose frequency is not more than a first cutoff frequency. Here, the frequency component to be removed or decreased by the high-pass filter 840 includes a frequency component caused by the variation in wheel speed due to steering and/or the like. Note that the first cutoff frequency in the high-pass filter 840 and a first order of the high-pass filter 840 can be freely set. Accordingly, a more suitable value can be set on the basis of experimental values.

The absolute value calculating section 842 calculates an absolute value of an output signal from the high-pass filter 840 and provides the absolute value to the low-pass filter 844.

The low-pass filter 844 generates and outputs a signal indicative of the variation in wheel speed by removing or decreasing, from an output from the absolute value calculating section 842, a frequency component whose frequency is not less than a second cutoff frequency. In other words, the low-pass filter 844 calculates the variation in wheel speed as a certain kind of energy which is an indicator of the road surface condition. The second cutoff frequency in the low-pass filter 844 and a second order of the low-pass filter 844 can be freely set. Accordingly, a more suitable value can be set on the basis of experimental values.

The coefficient determining section 846 outputs a coefficient in accordance with an output value from the low-pass filter 844. For example, the coefficient determining section 846 sets the coefficient such that the coefficient outputted in a case where the output value from the low-pass filter 844 is not less than a predetermined threshold is smaller than the coefficient outputted in a case where the output value from the low-pass filter 844 is less than the predetermined threshold.

In a more specific example, the coefficient determining section 846 outputs "0" as the coefficient if the output value from the low-pass filter 844 is not less than the predetermined threshold, whereas the coefficient determining section 846 outputs "1" as the coefficient if the output value from the low-pass filter 844 is less than the predetermined threshold. A case where the output value from the low-pass filter 844 is not less than the predetermined threshold corresponds to a case where the road surface is rough, whereas a case where the output value from the low-pass filter 844 is less than the predetermined threshold corresponds to a case where the road surface is not rough. In this way, the coefficient determining section 846 outputs a coefficient having a value in accordance with the road surface condition.

In the road surface determining section 84 configured as above, the high-pass filter 840 extracts a variation in wheel speed due to the road surface condition, the low-pass filter 844 outputs a signal indicative of the variation in wheel speed, and the coefficient determining section determines, in accordance with the signal outputted from the low-pass filter 844, the value of the coefficient by which the first desired control variable is multiplied.

The above configuration makes it possible to suitably determine the value of the coefficient in accordance with the result of determination of the road surface condition which result is obtained with reference to the wheel speed signal.

Further, as described above, the coefficient determining section 846 sets the coefficient such that the coefficient outputted in a case where the output value from the low-pass filter 844 is not less than a predetermined threshold is smaller than the coefficient outputted in a case where the output value from the low-pass filter 844 is less than the predetermined threshold.

In general, in some conditions of the road surface, higher ride comfort can be achieved by outputting the steering angle-derived desired control variable but no torque-derived desired control variable. The coefficient determining section 846 configured as above can output the steering angle-derived desired control variable in preference to the torque-derived desired control variable depending on road surface conditions. This makes it possible to achieve higher ride comfort.

(Steering Control Section)

Figure 7:
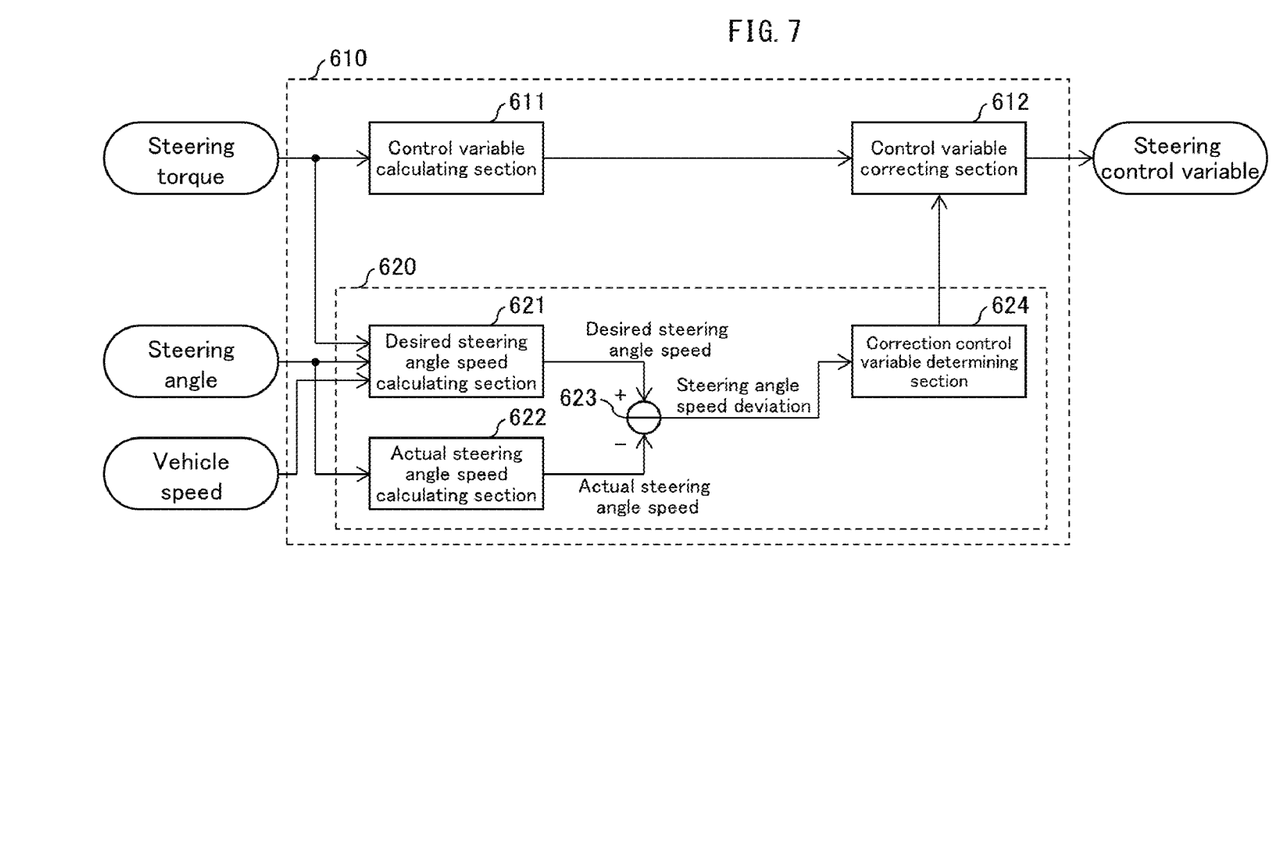
FIG. 7 is a block diagram illustrating an example configuration of a steering control section in accordance with Embodiment 1 of the present invention.

Next, the following will more specifically discuss the steering control section 610 with reference to FIG. 7. FIG. 7 is a block diagram illustrating an example configuration of the steering control section 610.

As illustrated in FIG. 7, the steering control section 610 includes a control variable calculating section 611, a control variable correcting section 612, and a ω feedback section 620.

The control variable calculating section 611 calculates a control variable for controlling the magnitude of the assist torque or the reaction torque, with reference to the steering torque supplied from the torque sensor 430. The control variable calculated by the control variable calculating section 611 is supplied to the torque applying section 460 as the steering control variable, after the control variable is corrected by the control variable correcting section 612.

(ω Feedback Section)

The ω feedback section 620 determines a value of a correction control variable, with reference to the steering angle supplied from the steering angle sensor 440, a vehicle speed determined on the basis of the wheel speed detected by the wheel speed sensor 320, and the steering torque supplied from the torque sensor 430.

The ω feedback section 620 includes, for example, a desired steering angle speed calculating section 621, an actual steering angle speed calculating section 622, a subtracting section 623, and a correction control variable determining section 624, as illustrated in FIG. 3.

The desired steering angle speed calculating section 621 calculates a desired steering angle speed, with reference to the steering angle supplied from the steering angle sensor 440, the vehicle speed determined on the basis of the wheel speed detected by the wheel speed sensor 320, and the steering torque supplied from the torque sensor 430. A specific method of calculating the desired steering angle speed here by no means limits Embodiment 1. The desired steering angle speed calculating section 621 can be configured to refer to a desired steering angle speed map and a torque ratio map in calculating the desired steering angle speed.

The actual steering angle speed calculating section 622 specifies the actual steering angle by calculating a change over time in steering angle supplied from the steering angle sensor 440.

The subtracting section 623 subtracts the actual steering angle calculated by the actual steering angle speed calculating section 622, from the desired steering angle speed calculated by the desired steering angle speed calculating section 621, and supplies, to the correction control variable determining section 624, a deviation of steering angle speed which deviation is a result of the above subtraction.

The correction control variable determining section 624 determines the value of the correction control variable in accordance with the deviation of steering angle speed. The value of the correction control variable thus determined is supplied to the control variable correcting section 612. Note that a specific method of determining the value of the correction control variable by no means limits Embodiment 1. The correction control variable determining section 624 can be configured to refer to a steering angle speed deviation correction control variable map in determining the value of the correction control variable.

The control variable correcting section 612 generates a steering control variable by adding, to the control variable calculated by the control variable calculating section 611, the correction control variable which is supplied from the correction control variable determining section 624. In other words, the control variable correcting section 612 corrects the control variable calculated by the control variable calculating section 611 with reference to the steering torque, with reference to the steering angle of the steering member 410 and the steering angle speed of the steering member 410.

Embodiment 2

Though the description in Embodiment 1 has dealt with the configuration, as an example, in which the steering angle and steering torque to be referred to by the rolling attitude control section 682 included in the suspension control section 650 are obtained from the CAN 370, an embodiment of the invention described in the present specification is not limited to such a configuration.

The description in Embodiment 2 will deal with a configuration in which the steering angle and steering torque to be referred to by the rolling attitude control section 682 are supplied from the steering control section 610.

Figure 8:
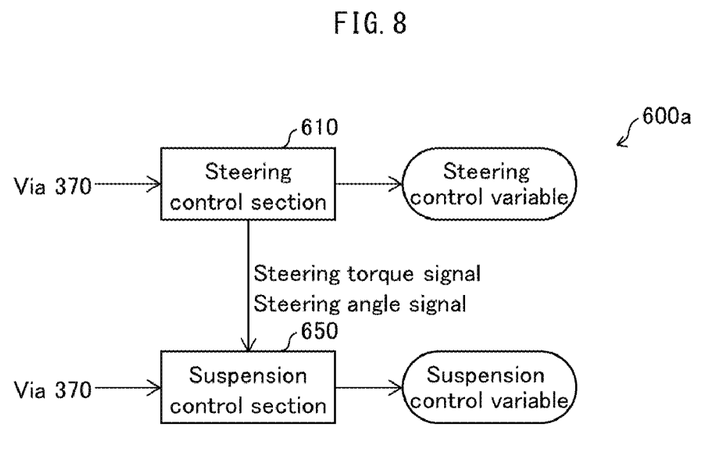
FIG. 8 is a block diagram schematically illustrating an ECU in accordance with Embodiment 2 of the present invention.

FIG. 8 is a diagram schematically illustrating a configuration of an ECU 600a in accordance with Embodiment 2 of the present invention.

As illustrated in FIG. 8, the ECU 600a includes the steering control section 610 and the suspension control section 650. The ECU 600a illustrated in FIG. 8 differs from the ECU 600 described in Embodiment 1 in the following points.

That is, in the ECU 600a, the steering control section 610 supplies, to the suspension control section 650, (i) the steering torque signal indicative of the steering torque which is applied to the steering member 410 and (ii) the steering angle signal indicative of the steering angle of the steering member 410, and the rolling attitude control section 682 included in the suspension control section 650 carries out rolling attitude control by calculating desired control variables with reference to the steering torque signal and steering angle signal supplied from the steering control section 610. A specific process performed by the rolling attitude control section 682 is the one as described in Embodiment 1.

In the configuration of Embodiment 2, it is not necessary for the rolling attitude control section 682 to obtain the steering torque signal and steering angle signal via the CAN 370. Accordingly, the configuration of Embodiment 2 makes it possible to reduce transmission load on the CAN 370. Note that the steering torque signal to be used may be a steering torque signal having been subjected to phase compensation. It is expected that this configuration achieves higher ride comfort.

Embodiment 3

Though Embodiments 1 and 2 described a configuration in which a road surface determining section 84 refers to a wheel speed signal indicative of wheel speeds of four wheels, as a reference signal for road surface determination, an embodiment of the invention described in the present specification is not limited to such a configuration. The following will discuss a case where the road surface determining section 84 refers to a reference signal other than the wheel speed signal.

Note that in a case where the road surface determining section 84 refers to a reference signal described below, parameters, such as cutoff frequencies in a high-pass filter 840 and a low-pass filter 844, should be set to suitable values in accordance with the reference signal.

Further, the road surface determining section 84 can be configured to include a plurality of signal processing paths including the high-pass filter 840 and the low-pass filter 844, and to carry out road surface determination with reference to a plurality of signals from among various reference signals including the above-described wheel speed signal and various reference signals below. This configuration makes it possible to improve accuracy of the road surface determination.

Example 1

Steering Angle Signal

The road surface determining section 84 can determine a road surface condition with reference to a steering angle signal indicative of a steering angle of a steering member 410. In general, in a case where a road surface is bumpy, the steering angle varies due to that bumpy road surface. Therefore, it can be said that the steering angle signal is a suitable signal for determining the road surface condition.

Example 2

Steering Torque

The road surface determining section 84 can determine the road surface condition with reference to a steering torque signal indicative of a steering torque which is applied to the steering member 410. In general, in a case where a road surface is bumpy, the steering torque varies due to that bumpy road surface. Therefore, it can be said that the steering torque signal is a suitable signal for determining the road surface condition.

Example 3

Rotation of Steering Assist Motor

The road surface determining section 84 can determine the road surface condition with reference to rotation of a motor (steering assist motor) which is provided in the torque applying section 460. In a case where a road surface is bumpy, the number of rotations of the steering assist motor varies due to that bumpy road surface. Therefore, it can be said that the number of rotations of the steering assist motor is a suitable signal for determining the road surface condition.

Example 4

Yaw Rate Signal

The road surface determining section 84 can determine the road surface condition with reference to a yaw rate signal indicative of a yaw rate of a vehicle 900. In a case where a road surface is bumpy, variation in the yaw rate of the vehicle 900 is caused directly by that bumpy road surface or indirectly by that bumpy road surface via the steering torque and/or the like. Therefore, it can be said that the yaw rate signal is a suitable signal for determining the road surface condition.

Example 5

Lateral G Signal and Longitudinal G Signal

The road surface determining section 84 can determine the road surface condition with reference to at least either one of a lateral G signal indicative of an acceleration in a lateral direction of the vehicle 900 and a longitudinal G signal indicative of an acceleration in a longitudinal direction of the vehicle 900. In a case where a road surface is bumpy, variation in the acceleration in the lateral direction of the vehicle 900 and variation in the acceleration in the longitudinal direction of the vehicle 900 are caused directly by that bumpy road surface or indirectly by that bumpy road surface via the steering torque and/or the like. Therefore, it can be said that the lateral G signal and the longitudinal G signal are suitable signals for determining the road surface condition.

Example 6

Vertical G Signal

The vehicle 900 can be configured to include a vertical G sensor for detecting an acceleration in a vertical direction of the vehicle 900. Then, the road surface determining section 84 can be configured to determine the road surface condition with reference to the vertical G signal indicative of the acceleration in the vertical direction.

In a case where a road surface is bumpy, the acceleration in the vertical direction of the vehicle 900 varies due to that bumpy road surface. Therefore, it can be said that the vertical G signal is a suitable signal for determining the road surface condition.

Example 7

Pitch Rate

The road surface determining section 84 can determine the road surface condition with reference to at least either one of a pitch rate calculated by a vehicle state predicting section 670 and a pitch rate in acceleration/deceleration which pitch rate is calculated by an acceleration/deceleration and turn steering correction variable calculating section 671. In a case where a road surface is bumpy, variation in the pitch rate is caused directly by that bumpy road surface or indirectly by that bumpy road surface via the steering torque and/or the like. Therefore, it can be said that the pitch rate is a suitable signal for determining the road surface condition.

[Software Implementation Example]

Control blocks of the ECU 600 and the ECU 600a (particularly, the steering control section 610 and the suspension control section 650) can be realized by a logic circuit (hardware) provided in an integrated circuit (IC chip) or the like or can be alternatively realized by software as executed by a central processing unit (CPU).

In the latter case, the ECU 600 and the ECU 600a each include a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

100: Suspension (suspension)
200: Vehicle body
600: ECU (control device, control section)
610: Steering control section
650: Suspension control section (suspension control device)
682: Rolling attitude control section (control variable calculating section)
81: First desired control variable calculating section
82: Second desired control variable calculating section
83: Selecting section (desired control variable selecting section)
84: Road surface determining section
840: High-pass filter
844: Low-pass filter
846: Coefficient determining section
900: Vehicle

The invention claimed is:

1. A suspension control device for controlling a damping force of a suspension, comprising:
   a road surface determining section configured to determine a road surface condition; and
   a control variable calculating section configured to calculate, in accordance with a result of the determination by the road surface determining section, a steering-based desired control variable which is to be referred to in controlling the damping force of the suspension,
   the control variable calculating section comprising:
   a first desired control variable calculating section configured to calculate a first desired control variable which is to be referred to in calculating the steering-based desired control variable;
   a second desired control variable calculating section configured to calculate a second desired control variable which is to be referred to in calculating the steering-based desired control variable;
   a multiplying section configured to multiply a value of the first desired control variable by a coefficient in accordance with the result of the determination by the road surface determining section; and
   a selecting section configured to select the steering-based desired control variable from a plurality of candidates including the first desired control variable multiplied by the coefficient and the second desired control variable,
   the first desired control variable calculating section being configured to calculate the first desired control variable with reference to a steering torque signal indicative of a steering torque which is applied to a steering member used by a driver for steering,
   the second desired control variable calculating section being configured to calculate the second desired control variable with reference to a steering angle signal of the steering member.

2. The suspension control device according to claim 1, wherein the road surface determining section includes:

a high-pass filter configured to act on a reference signal for carrying out the determination of the road surface condition;

a low-pass filter provided in a stage subsequent to the high-pass filter; and a coefficient determining section configured to determine the coefficient in accordance with an output from the low-pass filter.

3. The suspension control device according to claim 2, wherein the coefficient determining section sets the coefficient such that the coefficient outputted in a case where an output from the low-pass filter is not less than a predetermined threshold is smaller than the coefficient outputted in a case where the output from the low-pass filter is less than the predetermined threshold.

4. The suspension control device according to claim 3, wherein the road surface determining section determines the road surface condition with reference to a wheel speed signal indicative of a wheel speed.

5. The suspension control device according to claim 2, wherein the road surface determining section determines the road surface condition with reference to a wheel speed signal indicative of a wheel speed.

6. The suspension control device according to claim 1, wherein the road surface determining section determines the road surface condition with reference to a wheel speed signal indicative of a wheel speed.

7. A suspension device comprising:

a suspension; and a control section configured to control a damping force of the suspension, the control section comprising:

a road surface determining section configured to determine a road surface condition; and a control variable calculating section configured to calculate, in accordance with a result of the determination by the road surface determining section, a steering-based desired control variable which is to be referred to in controlling the damping force of the suspension, the control variable calculating section comprising:

a first desired control variable calculating section configured to calculate a first desired control variable which is to be referred to in calculating the steering-based desired control variable;

a second desired control variable calculating section configured to calculate a second desired control variable which is to be referred to in calculating the steering-based desired control variable;

a multiplying section configured to multiply a value of the first desired control variable by a coefficient in accordance with the result of the determination by the road surface determining section; and a selecting section configured to select the steering-based desired control variable from a plurality of candidates including the first desired control variable multiplied by the coefficient and the second desired control variable, the first desired control variable calculating section being configured to:

calculate the first desired control variable with reference to a steering torque signal indicative of a steering torque which is applied to a steering member used by a driver for steering; and output, as the first desired control variable, a control variable having a higher value selected from between a control variable calculated with reference to a torque indicated by the steering torque signal and a control variable calculated with reference to a torque speed indicating a change over time in the torque, the second desired control variable calculating section being configured to:

calculate the second desired control variable with reference to a steering angle signal of the steering member; and output, as the second desired control variable, a control variable having a higher value selected from between a control variable calculated with reference to a steering angle indicated by the steering angle signal and a control variable calculated with reference to a steering angle speed indicating a change over time in the steering angle.

* * * * *